(12) United States Patent
Zheng et al.

(10) Patent No.: US 11,232,324 B2
(45) Date of Patent: Jan. 25, 2022

(54) METHODS AND APPARATUS FOR RECOMMENDING COLLOCATING DRESS, ELECTRONIC DEVICES, AND STORAGE MEDIA

(71) Applicant: SHENZHEN SENSETIME TECHNOLOGY CO., LTD., Guangdong (CN)

(72) Inventors: Baowen Zheng, Shenzhen (CN); Shi Qiu, Shenzhen (CN); Yimin Chen, Shenzhen (CN); Liang Lin, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 219 days.

(21) Appl. No.: 16/701,268

(22) Filed: Dec. 3, 2019

(65) Prior Publication Data

US 2020/0104633 A1    Apr. 2, 2020

Related U.S. Application Data

(63) Continuation of application No. PCT/CN2018/091145, filed on Jun. 13, 2018.

(30) Foreign Application Priority Data

Jun. 16, 2017  (CN) .......................... 201710458081.3

(51) Int. Cl.
*G06K 9/62*       (2006.01)
*G06T 7/73*       (2017.01)
(Continued)

(52) U.S. Cl.
CPC ........... *G06K 9/6215* (2013.01); *G06F 16/53* (2019.01); *G06K 9/46* (2013.01); *G06K 9/6256* (2013.01);
(Continued)

(58) Field of Classification Search
CPC ...... G06F 16/53; G06K 9/00677; G06K 9/46; G06K 9/6215; G06K 9/6256;
(Continued)

(56) References Cited

U.S. PATENT DOCUMENTS

2009/0094260 A1    4/2009  Cheng
2011/0082764 A1    4/2011  Flusser
(Continued)

FOREIGN PATENT DOCUMENTS

CN    103455920 A    12/2013
CN    104484450 A     4/2015
(Continued)

OTHER PUBLICATIONS

International Search Report in the international application No. PCT/CN2018/091145, dated Aug. 16, 2018.
(Continued)

*Primary Examiner* — Manuchehr Rahmjoo
(74) *Attorney, Agent, or Firm* — Pattao, LLC; Junjie Feng

(57) ABSTRACT

A method for recommending collocating dress includes: obtaining a first dress image from an input image; obtaining a first dress feature of the first dress image; obtaining, based on the first dress feature, a second dress feature matching the first dress feature from a collocation database, the second dress feature being a dress feature of a second dress image; and obtaining, based on the second dress feature, a dress image identical to and/or similar to the second dress image from a recommendation database as a collocating dress image. Based on the method in the embodiments, at least one collocation recommendation is provided for a dress image, and the recommendation result is more objective and is more in accordance with user demands.

18 Claims, 6 Drawing Sheets

(51) Int. Cl.
    *G06F 16/53*     (2019.01)
    *G06K 9/46*     (2006.01)
    *G06K 9/72*     (2006.01)
    *G06Q 30/06*     (2012.01)
    *G06T 7/60*     (2017.01)

(52) U.S. Cl.
    CPC ............ *G06K 9/6267* (2013.01); *G06K 9/726* (2013.01); *G06Q 30/0627* (2013.01); *G06Q 30/0631* (2013.01); *G06Q 30/0643* (2013.01); *G06T 7/60* (2013.01); *G06T 7/73* (2017.01); *G06T 2207/20221* (2013.01)

(58) Field of Classification Search
    CPC .... G06K 9/6267; G06K 9/6271; G06K 9/726; G06Q 30/0627; G06Q 30/0631; G06Q 30/0643; G06T 2207/20221; G06T 7/60; G06T 7/73
    See application file for complete search history.

(56) References Cited

U.S. PATENT DOCUMENTS

| | | |
|---|---|---|
| 2015/0302505 A1 | 10/2015 | Di |
| 2016/0189011 A1 | 6/2016 | Bhardwaj et al. |
| 2017/0076011 A1 | 3/2017 | Gannon |
| 2017/0337611 A1 | 11/2017 | Hsiao et al. |
| 2019/0266795 A1* | 8/2019 | Aluru ................ G06T 17/10 |

FOREIGN PATENT DOCUMENTS

| | | |
|---|---|---|
| CN | 104951966 A | 9/2015 |
| CN | 105224775 A | 1/2016 |
| CN | 105975071 A | 9/2016 |
| CN | 106156297 A | 11/2016 |
| CN | 106407421 A | 2/2017 |
| CN | 106504064 A | 3/2017 |
| JP | H11212990 A | 8/1999 |
| JP | 2009128995 A | 6/2009 |
| JP | 2009266166 A | 11/2009 |
| JP | 2010536087 A | 11/2010 |
| JP | 2018515861 A | 6/2018 |
| WO | 2016188277 A1 | 12/2016 |

OTHER PUBLICATIONS

English Translation of the Written Opinion of the International Search Authority in the international application No. PCT/CN2018/091145, dated Aug. 16, 2018.
First Office Action of the Chinese application No. 201710458081.3, dated May 8, 2019.
Second Office Action of the Chinese application No. 201710458081.3, dated Nov. 1, 2019.
Written Opinion of the Singaporean application No. 11201911626X, dated Apr. 27, 2021.

* cited by examiner

METHODS AND APPARATUS FOR RECOMMENDING COLLOCATING DRESS, ELECTRONIC DEVICES, AND STORAGE MEDIA

CROSS-REFERENCE TO RELATED APPLICATIONS

The present application is a continuation of International Application No. PCT/CN2018/091145 filed on Jun. 13, 2018, which claims priority to Chinese Patent Application No. 201710458081.3 filed on Jun. 16, 2017. The disclosures of these applications are hereby incorporated by reference in their entirety.

BACKGROUND

The application of intelligent recommendation systems in e-commerce is getting more and more attention, and when the intelligent recommendation systems provide recommendations or collocation suggestions for users in e-commerce, the recommendations or collocation suggestions are usually formed by searching commodities in the database according to commodity correlations.

SUMMARY

Embodiments of the present disclosure relate to the technical field of image processing, and in particular, to methods and apparatuses for recommending collocating dress, electronic devices, and storage media.

Embodiments of the present disclosure provide collocating dress recommendation technologies.

According to one aspect of the embodiments of the present disclosure, provided is a method for recommending collocating dress, including: obtaining a first dress image from an input image; obtaining a first dress feature of the first dress image; obtaining, based on the first dress feature, a second dress feature matching the first dress feature from a collocation database, the second dress feature being a dress feature of a second dress image; and obtaining, based on the second dress feature, a dress image identical to and/or similar to the second dress image from a recommendation database as a collocating dress image.

According to another aspect of the embodiments of the present disclosure, provided is an apparatus for recommending collocating dresss, including: a memory storing processor-executable instructions; and a processor arranged to execute the stored processor-executable instructions to perform operations of: obtaining a first dress image from an input image; obtaining a first dress feature of the first dress image; obtaining, based on the first dress feature, a second dress feature matching the first dress feature from a collocation database, the second dress feature being a dress feature of a second dress image; and obtaining, based on the second dress feature, a dress image identical to and/or similar to the second dress image from a recommendation database as a collocating dress image.

According to another aspect of the embodiments of the present disclosure, provided is a non-transitory computer readable storage medium having stored thereon computer-readable instructions that, when executed by a processor, cause the processor to implement operations of a method for recommending collocating dress, the method including: obtaining a first dress image from an input image; obtaining a first dress feature of the first dress image; obtaining, based on the first dress feature, a second dress feature matching the first dress feature from a collocation database, the second dress feature being a dress feature of a second dress image; and obtaining, based on the second dress feature, a dress image identical to and/or similar to the second dress image from a recommendation database as a collocating dress image.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure may be understood more clearly with reference to the accompanying drawings.

DETAILED DESCRIPTION OF THE PREFERRED EMBODIMENTS

Figure 1:
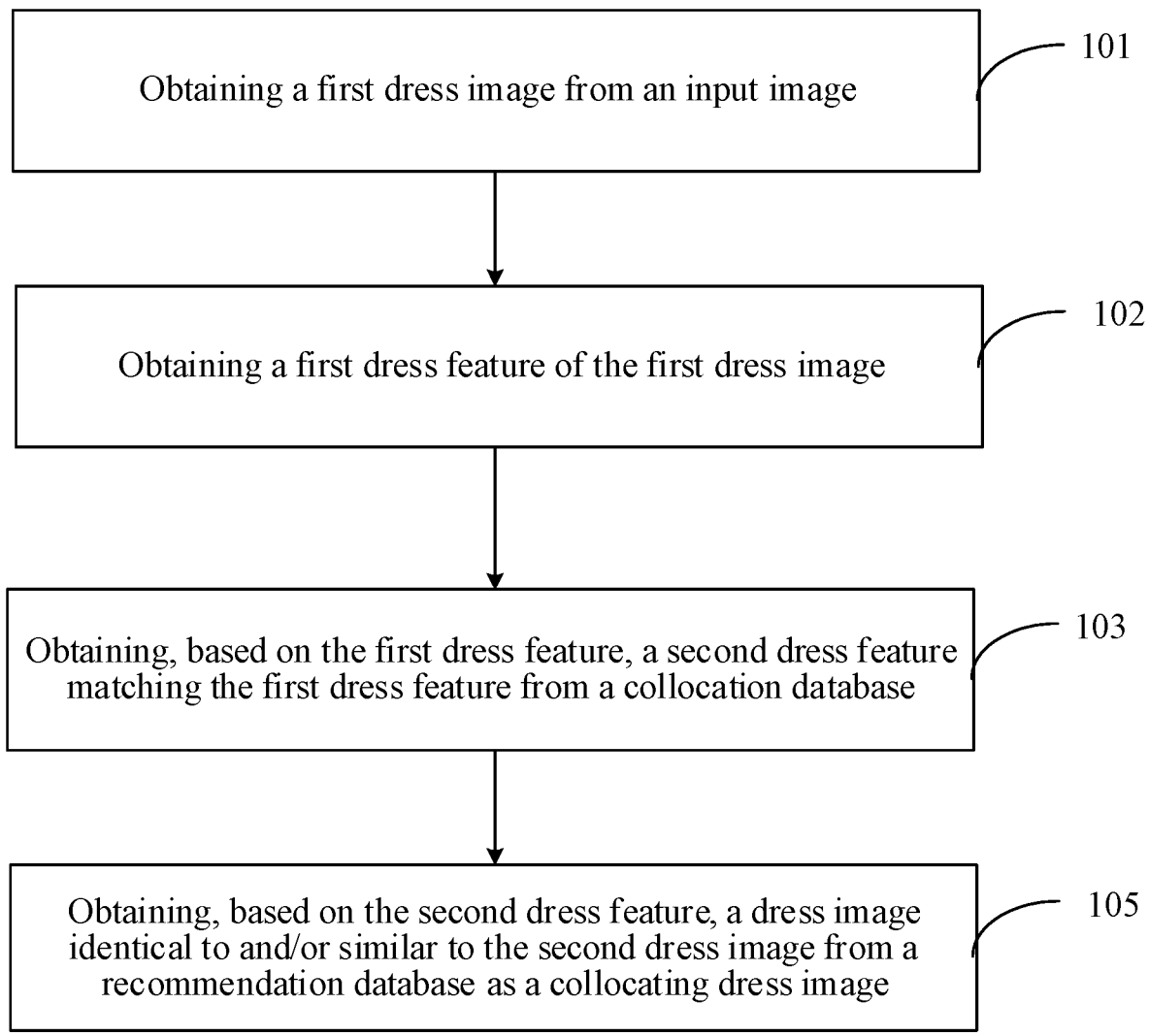
FIG. 1 is a flowchart of one embodiment of a method for recommending collocating dress according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer system. Generally, the program modules may include routines, programs, target programs, components, logics, data structures, and the like for performing specific tasks or implementing specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart of one embodiment of a method for recommending collocating dress according to the present disclosure. As shown in FIG. 1, the method in the present embodiment includes the following operations.

At operation 101, a first dress image is obtained from an input image.

One first dress image, or at least two first dress images are obtained. According to one or more embodiments of the present disclosure, the number of obtained first dress images is determined based on the input image and the choice of a user. If the input image merely includes one dress, merely one first dress image is obtained. If the input image includes at least two dresses, the user may select to obtain one of the first dress images or all the first dress images.

The first dress image includes a clothing image and/or a fashion accessory image. The clothing image includes, but not limited to, a top image, a pant image, a skirt image, and/or the like. The fashion accessory image includes, but not limited to, a scarf image, a hat image, a shoe image, a glove image, an accessory image, a sock image, and/or the like. The accessory image includes, but not limited to, items for decorating human bodies, such as, for example, a necklace, a bracelet, a ring, and an earring, and the listed items above are not used to limit the present disclosure. The dress image mentioned in the method of the present disclosure generally refers to items applied to the human body and having a collocation demand.

In an optional example, operation 101 may be executed by a processor by invoking a corresponding instruction stored in a memory, or may be executed by an image acquisition unit 31 run by the processor.

At operation 102, a first dress feature of the first dress image is obtained.

According to one or more embodiments of the present disclosure, in order to analyze the first dress image, the first dress feature in the image should be obtained, and the dress feature may be obtained by using a machine algorithm in the present embodiments. In this case, if there is merely one first dress image, the first dress feature is obtained directly by using the machine algorithm, and if there are at least two first dress images, at least two first dress features are obtained respectively by using the machine algorithm.

In an optional example, operation 102 may be executed by a processor by invoking a corresponding instruction stored in a memory, or may be executed by a feature acquisition unit 32 run by the processor.

At operation 103, based on the first dress feature, a second dress feature matching the first dress feature is obtained from a collocation database.

The second dress feature is a dress feature of a second dress image. The second dress image collocates with the first dress image.

In an optional example, the operation 103 may be executed by a processor by invoking a corresponding instruction stored in a memory, or may be executed by a dress collocation unit 33 run by the processor.

At operation 105, based on the second dress feature, a dress image identical to and/or similar to the second dress image is obtained from a recommendation database as a collocating dress image.

In an optional example, the operation 105 may be executed by a processor by invoking a corresponding instruction stored in a memory, or may be executed by a dress recommendation unit 34 run by the processor.

Based on the method for recommending collocating dress provided by the embodiment of the present disclosure above, a first dress image is obtained from an input image to achieve the purpose of automatically separating a dress from an image, a first dress feature of the first dress image is obtained, and analysis and collocation are carried out on the dress in the dress image based on the dress feature; a second dress feature matching the first dress feature is obtained from collocation data based on the first dress feature, so that a search, based on the first dress feature, for the second dress feature having a matching relationship with the first dress feature is achieved, where a second dress image corresponding to the second dress feature has a collocation relationship with the first dress image corresponding to the first dress feature; and based on the second dress feature, a dress image identical to and/or similar to the second dress image is obtained from a recommendation database as a collocating dress image, and a large amount of collocating dress images having collocation relationships with the first dress image is obtained from the recommendation database, so as to achieve the purpose of recommending a large amount of collocations to a user. Based on the embodiment of the present embodiment, a user merely needs to provide an image which contains a dress to obtain corresponding collocation recommendations based on one or more dress images in the image, thereby providing at least one collocation recommendation for the dress image, overcoming subjective errors caused by human recommendations, and providing the recommendation results for the dress images more objective and more in accordance with user demands.

In an optional example of the embodiment of the method for recommending collocating dress in the present disclosure above, building the collocation database includes:

obtaining at least two dress features of each of a plurality of collocation reference images acquired; and storing the at least two dress features corresponding to each collocation reference image in one collocation storage entry, and storing all the collocation storage entries in the collocation database, that is, storing the at least two dress features corresponding to each collocation reference image in one collocation storage entry of the collocation database.

The at least two dress features in a collocation storage entry have a matching relationship, at least two dress images in the collocation reference image have a collocation relationship, and one same dress image may have a plurality of collocation reference images. For example, a piece of clothing may collocate with pants, or a skirt, or other accessories. Therefore, matching via the first dress feature and the dress features in the collocation storage entries may be accomplished at operation 103, and when a certain collocation storage entry has a dress feature identical to or similar to the first dress feature, the other dress feature in the collocation storage entry is the second dress feature which collocates with the first dress feature.

According to one or more embodiments of the present disclosure, the building of the collocation database may be executed before operation 101.

In an optional example of the embodiment of the method for recommending collocating dress in the present disclosure above, building the recommendation database includes:

obtaining a dress feature corresponding to each of a plurality of dress images; and classifying the dress images based on the dress features, and storing all the dress images into the recommendation database according to the classification.

According to one or more embodiments of the present disclosure, the plurality of dress images are classified based on a dress feature corresponding to each of the plurality of dress images, and the plurality of dress images are stored into the recommendation database according to the classification result of the plurality of dress images.

The recommendation database in the present embodiments includes the dress images classified and stored based on the dress features, that is, the dress feature corresponds to at least one dress image, and serves as an index for searches for the dress images. In this case, according to one or more embodiments of the present disclosure, it is merely required to perform matching between the second dress feature and the dress features serving as indexes at operation 105, so as to find the dress feature identical to and/or similar to the second dress feature, the corresponding dress image is obtained based on the found dress feature, and the obtained dress image has a collocatable relationship with the first dress image.

According to one or more embodiments of the present disclosure, the building of the recommendation database may be executed before operation 101.

In an optional example of the embodiment of the method for recommending collocating dress in the present disclosure above, operation 101 may include:

performing dress detection on the input image to obtain a position and size of the first dress image; and obtaining the first dress image from the input image based on a position and a size of the first dress image.

In the present embodiments, the input image may include one or more first dress images. In order to identify the first dress image in the input image, according to one or more embodiments of the present disclosure, the size and position of the first dress image is firstly identified. Where there is a plurality of first dress images, the sizes and positions of the first dress images are separately identified. Based on positions and sizes of the first dress images, all the first dress images are separated from the input image, and a dress image obtained each time is obtained based on the input image. In actual application, a user may merely want to obtain a recommended collocation of one or more first dress images in the input image, and in this case, a filtering approach is provided for the user. The user selects the one or more first dress images to be used for collocation recommendation by means of filtering, and then operation is merely carried out for the first dress image selected by the user, so that the time is saved, more targeted recommendations are provided for the user, and subsequent filtering time is saved for the user.

In another embodiment of the method for recommending collocating dress in the present disclosure, based on the embodiments above, in the method of the embodiment, the first dress feature includes at least one of a semantic dress feature or a numerical dress feature.

The semantic dress feature is used for expressing an attribute feature of the first dress image in the form of text, and includes at least one semantic feature.

The numerical dress feature is used for expressing an attribute feature of the first dress image with a matrix or an array.

In the present embodiments, the method for extracting the dress feature from the dress image includes, but not limited to, establishing a convolutional neural network model in the machine learning field, and in this case, the semantic dress feature and the numerical dress feature are outputs of different layers of the convolutional neural network, respectively. The semantic dress feature is obtained by converting an image by means of a computer algorithm and taken as an attribute for describing clothing or a fashion accessory in the form of text, and may include, but not limited to, a dress category, a pattern, a color, a material, a shape, a size, a degree of tightness, the length, details, and/or the like. The numerical dress feature is used for determining whether two images are similar. The numerical dress feature may include, but not limited to, a pixel value (e.g., a numerical dress feature of a dress image is 256*256 pixels), and mainly provides a basis for calculating the similarity between two images.

In an optional example of the embodiment of the method for recommending collocating dress in the present disclosure, the process of obtaining a first dress feature of the first dress image at operation 102 includes:

obtaining a pixel matrix of the first dress image, where the pixel matrix includes pixels of multiple positions in the first dress image;

determining a dress feature matrix of the first dress image according to the pixel matrix of the first dress image; and determining the numerical dress feature of the first dress image based on the dress feature matrix.

According to one or more embodiments of the present disclosure, a semantic tag probability array of the first dress image is obtained according to the numerical dress feature of the first dress image, and may include at least one semantic tag probability. The semantic tag probability is used for representing a probability value of the first dress image in terms of attributes.

The semantic feature of the first dress image is obtained based on the semantic tag probability array.

In the present embodiments, the numerical dress feature is obtained based on an end-to-end model, and may optionally include: a. inputting a pixel matrix of an image; b. calculating a semantic tag probability array, converting the semantic tag probability array into a semantic tag, where the semantic tag optionally includes a phrase for describing clothing, such as "trench coat", "sweater", "vest", or "skirt", and meanwhile, calculating respective probabilities about the possibility that the clothing is a "trench coat", a "sweater", a "vest", a "skirt", or the like, such as adding a "trench coat" tag to a certain component image with a corresponding feature value array [trench coat: 90%, sweater: 1%, vest: 1%, skirt: 1%, . . . ], where the semantic tag with the largest probability is used herein; and c. outputting the feature value array and the obtained semantic tag.

In an optional example of the embodiment of the method for recommending collocating dress in the present disclosure, the process of obtaining a dress feature of any dress image at operation 102 includes:

obtaining the dress feature of the first dress image by means of a convolutional neural network.

The method according to the present embodiments further includes:

training an initial convolutional neural network model by using sample images in advance to obtain the convolutional neural network, where the sample images are annotated with a dress feature.

According to one or more embodiments of the present disclosure, the dress feature annotated on the sample images includes at least one of a semantic dress feature or a numerical dress feature.

In an optional example, the operation may be executed by a processor by invoking a corresponding instruction stored in a memory, or may be executed by a pre-training unit run by the processor.

The semantic tag probability array is obtained by means of the end-to-end model obtained through training. The end-to-end model may include, but not limited to, a convolutional neural network model. The end-to-end model is characterized in that model parameters required in the process of converting the image into features are all obtained in a data-driven machine learning process, and the parameters obtained in this process are subjected to mathematical optimization. The semantic dress feature obtained through calculation based on the optimized parameters has better expression effect for the dress image than the semantic dress feature obtained with human intervention. The human intervention in the prior art includes: a program logic designed by a human being, or parameter calculation set manually. Moreover, the sample images used for training the convolutional neural network model include a huge number of pre-stored sample images, usually of orders of magnitudes of hundreds of thousands or even millions, and the pre-stored sample images have known numerical dress features and semantic dress features. The convolutional neural network model obtained by training the initial convolutional neural network model with the huge number of sample images is relatively applicable to obtaining of a dress feature of a dress image.

Figure 2:
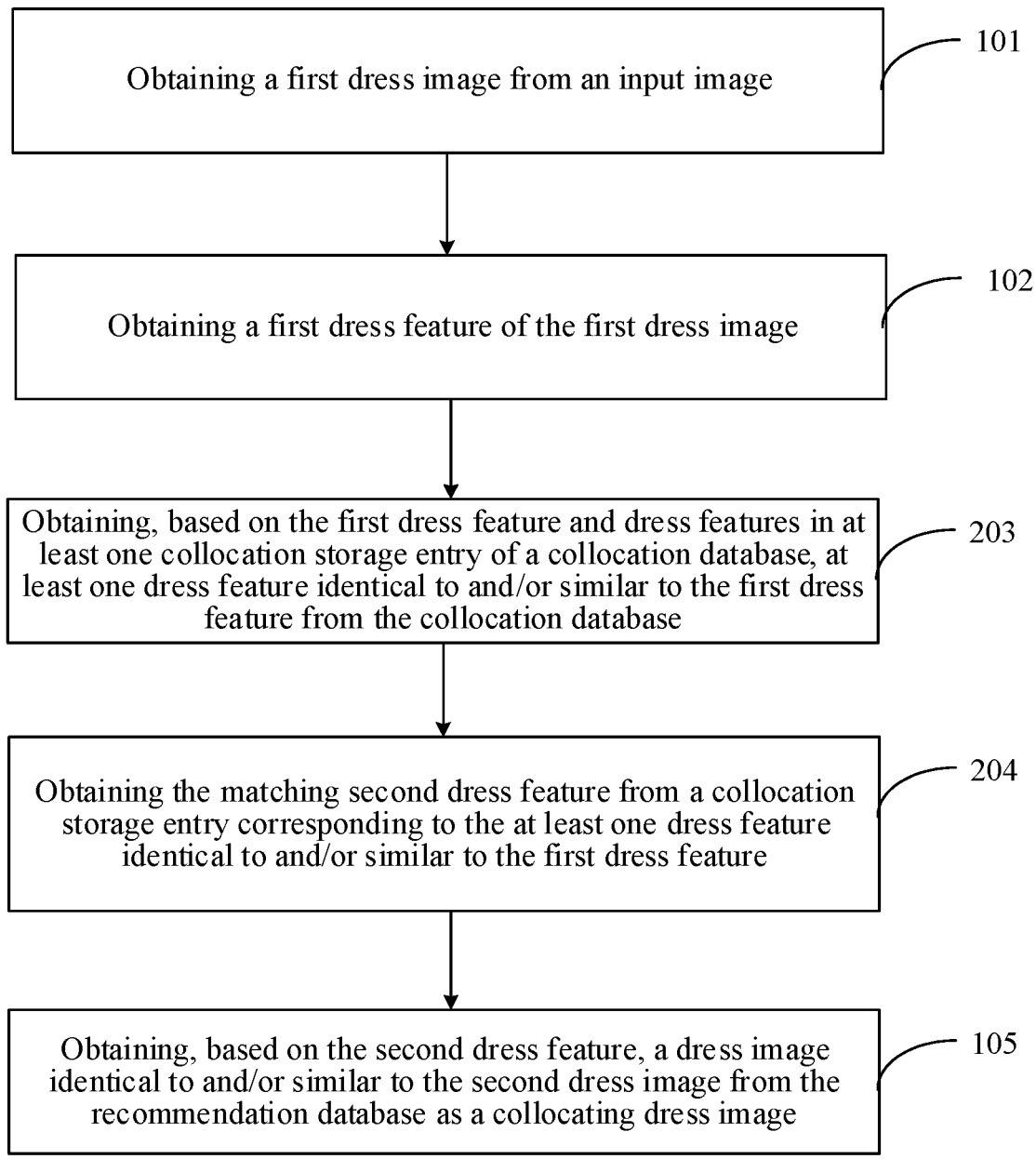
FIG. 2 is a flowchart of another embodiment of a method for recommending collocating dress according to the present disclosure.

FIG. 2 is a flowchart of another embodiment of the method for recommending collocating dress according to the present disclosure. Based on the embodiments above, as shown in FIG. 2, the method in the present embodiment includes the following operations.

At operation 101, a first dress image is obtained from an input image.

The first dress image includes, but not limited to, a clothing image and/or a fashion accessory image. The clothing image includes, but not limited to, a top image, a pant image, a skirt image, and/or the like. The fashion accessory image includes, but not limited to, a scarf image, a hat image, a shoe image, a glove image, an accessory image, a sock image, and/or the like. The accessory image includes, but not limited to, all items for decorating human bodies, such as, for example, a necklace, a bracelet, a ring, and an earring, and the listed items above are not used to limit the present disclosure. The dress image mentioned in the method of the present disclosure generally refers to items applied to the human body and having a collocation demand.

In an optional example, operation 101 may be executed by a processor by invoking a corresponding instruction stored in a memory, or may be executed by an image acquisition unit 31 run by the processor.

At operation 102, a first dress feature of the first dress image is obtained.

The first dress feature is extracted for carrying out analysis for the first dress image, and the first dress feature corresponding to the first dress image may be extracted by means of a machine algorithm, where one first dress feature may correspond to one first dress image, for providing a basis for identification on the first dress image and subsequent provision of the second dress image for the first dress image by means of collocation.

In an optional example, operation 102 may be executed by a processor by invoking a corresponding instruction stored in a memory, or may be executed by a feature acquisition unit 32 run by the processor.

At operation 203, based on the first dress feature and dress features in at least one collocation storage entry of a collocation database, at least one dress feature identical to and/or similar to the first dress feature is obtained from the collocation database.

Each collocation storage entry stores at least two dress features which match each other, and therefore, after one identical and/or similar dress feature is obtained from the collocation storage entry, a second dress feature matching the first dress feature is obtained.

In an optional example, operation 203 is performed by a processor by invoking a corresponding instruction stored in a memory, or is performed by a feature identification module 431 run by the processor.

At operation 204, the matching second dress feature is obtained from a collocation storage entry corresponding to the at least one dress feature identical to and/or similar to the first dress feature.

The at least two dress features stored in the collocation storage entry have a matching relationship, and therefore, the second dress feature collocating with the dress feature is directly obtained based on the dress feature in the collocation storage entry.

In an optional example, operation 204 is performed by a processor by invoking a corresponding instruction stored in a memory, or is performed by a feature acquisition module 432 run by the processor.

At operation 105, based on the second dress feature, a dress image identical to and/or similar to the second dress image is obtained from a recommendation database as a collocating dress image.

In an optional example, the operation 105 may be executed by a processor by invoking a corresponding instruction stored in a memory, or may be executed by a dress recommendation unit 34 run by the processor.

In the present embodiments, in the process of obtaining a dress feature of a reference dress from the collocation database based on the first dress image obtained from the input image, optionally, the first dress feature corresponding to the first dress image is obtained based on the first dress image, and the process of obtaining the first dress feature may be implemented by using the method provided by the embodiments above, or by using other methods to obtain a numerical dress feature and a semantic dress feature corresponding to the first dress image. By carrying out matching between the obtained first dress feature and dress features of all recommended collocation images having collocation relationships stored in the collocation database, at least one dress feature identical to and/or similar to the first dress feature is obtained, and thus the second dress feature having a collocation relationship with the first dress feature is obtained from the recommend collocation images having collocation relationships. In this case, the first dress image corresponding to the first dress feature has a good collocation relationship and effect with the dress image corresponding to the second dress feature. Therefore, a large number of collocating dress images having good collocation effects with regard to the first dress image may be obtained from the recommendation database based on the second dress feature.

In an optional example of the embodiment of the method for recommending collocating dress in the present disclosure above, operation 203 may include:

obtaining distances between a numerical dress feature of the first dress feature and numerical dress features of the dress features in the collocation database, respectively;

selecting one or more dress features, in the collocation database, having a shortest distance from the numerical dress feature of the first dress feature as first candidate features; and selecting a first candidate feature identical to the semantic dress feature of the first dress feature as the at least one dress feature identical to and/or similar to the first dress feature.

In the present embodiments, at least one candidate image having a relatively high degree of similarity with the first dress image is found from the collocation database according to a feature value array, for example, taking distances (e.g., Euclidean distances) between the numerical dress feature of the first dress image and features corresponding to images in the collocation database as measurement, the shorter the distance is, the higher the degree of similarity is therebetween. Otherwise, the longer the distance is, the lower the degree of similarity is therebetween. For the dress image obtained by further filtering, according to a semantic tag, the candidate images of which the distance-based degrees of similarity satisfy a preset condition, the dress image is at least one dress image identical to and/or similar to the first dress image, for example, the candidate image having the same semantic tag with a certain image passes the filtering, and the candidate image not having the same semantic tag with the certain image is removed by filtering.

It is impossible to determine whether two dress images are similar by means of a single numerical dress feature, for example, for two images having the same size and 256*256 pixels, subtraction is directly carried out on pixel values at the same positions of the two dress images, and the obtained difference value cannot reflect whether dress images in the two images are similar, where in the difference calculation method, the calculation is carried out according to distances, for example, Euclidean distances or other measurements. Moreover, the purpose of the conversion to a dress feature matrix or a numerical feature matrix is to compare whether two dress images are similar visually. In the present embodiments, determination is performed based on a difference between the numerical feature arrays corresponding to two dress images, and the smaller the difference is, the more similar the visual effects are.

In yet another embodiment of the method for recommending collocating dress in the present disclosure, based on the embodiments above, in the method of the embodiment, operation 105 further includes:

selecting, based on the second dress feature and the dress features of the plurality of dress images in the recommendation database, at least one dress feature identical to and/or similar to the second dress feature from the recommendation database; and taking the dress image corresponding to the at least one dress feature identical to and/or similar to the second dress feature as the collocating dress image.

In the present embodiments, the dress image corresponding to the dress feature identical to and/or similar to the second dress feature is obtained from the recommendation database and taken as the collocating dress image of the first dress image because the second dress feature and the first dress feature have a collocation relationship. Therefore, the dress image corresponding to the dress feature identical to and/or similar to the second dress feature collocates with the first dress image.

In an optional example of the embodiment of the method for recommending collocating dress in the present disclosure above, the selecting, based on the second dress feature and the dress features of the plurality of dress images in the recommendation database, at least one dress feature identical to and/or similar to the second dress feature from the recommendation database includes:

obtaining distances between a numerical dress feature of the second dress feature and numerical dress features of the dress images in the recommendation database, respectively;

selecting one or more dress features, in the recommendation database, having a shortest distance from the numerical dress feature of the second dress feature as second candidate features; and selecting the second candidate feature identical to the semantic dress feature of the second dress feature as the at least one dress feature identical to and/or similar to the second dress feature.

In the present embodiments, a collocating dress identical to and/or similar to a reference image is identified from the recommendation database based on the numerical dress feature and the semantic dress feature, and based on the process, although the dress image having similar a numerical dress feature to the reference dress and obtained by calculation based on a distance, is similar to the reference dress in the numerical dress feature, it may not be similar to the reference dress visually and in attributes. According to one or more embodiments of the present disclosure, in this case, by performing filtering based on the semantic dress feature of the reference dress, a dress image having a semantic dress feature that is not consistent with the semantic dress feature of the reference dress is deleted, so that the obtained dress image is similar to the reference dress in the numerical dress feature and the semantic dress feature, ensuring that the two images are similar in the visual effect.

In yet another embodiment of the method for recommending collocating dress in the present disclosure, based on the embodiments above, in the method of the embodiment, after operation 105, the following operations are further included:

outputting the collocating dress image; and/or synthesizing the first dress image with the collocating dress image to obtain one or more collocation effect images, and outputting the collocation effect images.

In an optional example, the operation may be executed by a processor by invoking a corresponding instruction stored in a memory, or may be executed by an output unit 55 run by the processor.

In the present embodiments, by outputting the collocating dress image and/or outputting the collocation effect image, the collocation effect for the dress image in the output image has a better visual effect, overcoming the defect of a recommendation method in the prior art being unable to directly reflect a visual collocation effect. A combined image having a visual collocation effect is directly outputted, and a user is able to view the collocation effect more directly.

In an optional example of the embodiments of the method for recommending collocating dress in the present disclosure as stated above, the collocating dress image is outputted, and/or when the collocation effect image is outputted, related feature information of the collocation dress is further outputted.

The related feature information is used for at least one of: describing part of features of the collocating dress different from other dresses, or used for describing the collocation effect of the dress corresponding to the first dress image, for example, outputting the brand and dress category of the collocating dress, and/or outputting information such as a score value for collocation with the first dress image.

The method for recommending collocating dress in the present embodiments is executed by any appropriate device having data processing capability, including, but not limited to, a PC machine.

Any method provided by the embodiments of the present disclosure is executed by any appropriate device having data processing capability, including, but not limited to, a terminal device and a server. Alternatively, any method provided in the embodiments of the present disclosure is executed by a processor, for example, any method mentioned in the embodiments of the present disclosure is executed by the processor by invoking a corresponding instruction stored in a memory. Details are not described below again.

A person of ordinary skill in the art may understand that: all or some operations of implementing the forgoing embodiments of the method may be achieved by a program by instructing related hardware; the foregoing program may be stored in a computer-readable storage medium; when the program is executed, operations including the foregoing embodiments of the method are performed; moreover, the foregoing storage medium includes various media capable of storing program codes such as an ROM, an RAM, a magnetic disk, or an optical disk.

Figure 3:
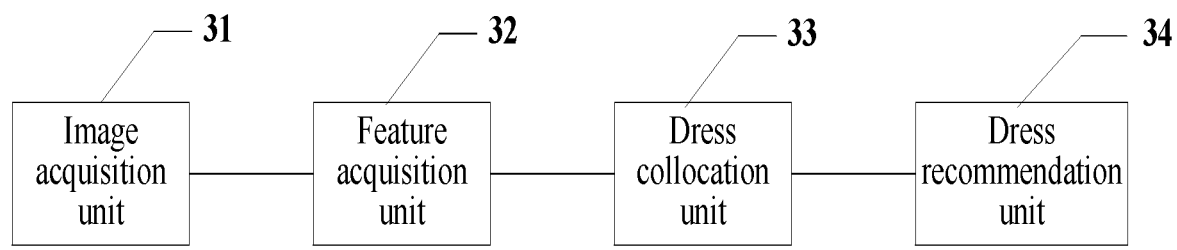
FIG. 3 is a schematic structural diagram of one embodiment of an apparatus for recommending collocating dress according to the present disclosure.

FIG. 3 is a schematic structural diagram of one embodiment of an apparatus for recommending collocating dress according to the present disclosure. The apparatus of this embodiment is used for implementing the foregoing method embodiments of the present disclosure. As shown in FIG. 3, the apparatus of this embodiment includes the following components.

An image acquisition unit 31 is configured to obtain a first dress image from an input image.

One first dress image, or at least two first dress images are obtained. According to one or more embodiments of the present disclosure, the number of obtained first dress images is determined based on the input image and the choice of a user. If the input image merely includes one dress, merely one first dress image is obtained. If the input image includes at least two dresses, the user may select to obtain one of the first dress images or all the first dress images.

The first dress image includes a clothing image and/or a fashion accessory image. The clothing image includes, but not limited to, a top image, a pant image, a skirt image, and/or the like. The fashion accessory image includes, but not limited to, a scarf image, a hat image, a shoe image, a glove image, an accessory image, a sock image, and/or the like. The accessory image includes, but not limited to, items for decorating human bodies, such as, for example, a necklace, a bracelet, a ring, and an earring, and the listed items above are not used to limit the present disclosure. The dress image mentioned in the method of the present disclosure generally refers to items applied to the human body and having a collocation demand.

A feature acquisition unit 32 is configured to obtain a first dress feature of the first dress image.

According to one or more embodiments of the present disclosure, in order to analyze the first dress image, the first dress feature in the image should be obtained, and the dress feature may be obtained by using a machine algorithm in the present embodiments. In this case, if there is merely one first dress image, the first dress feature is obtained directly by using the machine algorithm, and if there are at least two first dress images, at least two first dress features are obtained respectively by using the machine algorithm.

A dress collocation unit 33 is configured to obtain, based on the first dress feature, a second dress feature matching the first dress feature from a collocation database.

The second dress feature is a dress feature of a second dress image. According to one or more embodiments of the present disclosure, the second dress image collocates with the first dress image.

A dress recommendation unit 34 is configured to obtain, based on the second dress feature, a dress image identical to and/or similar to the second dress image from a recommendation database as a collocating dress image.

Based on the apparatus for recommending collocating dress provided by the embodiment of the present disclosure above, a first dress image is obtained from an input image to achieve the purpose of automatically separating a dress from an image, a first dress feature of the first dress image is obtained, and analysis and collocation are carried out on the dress in the dress image based on the dress feature; a second dress feature matching the first dress feature is obtained from collocation data based on the first dress feature, so that a search, based on the first dress feature, for the second dress feature having a matching relationship with the first dress feature is achieved, where a second dress image corresponding to the second dress feature has a collocation relationship with the first dress image corresponding to the first dress feature; and based on the second dress feature, a dress image identical to and/or similar to the second dress image is obtained from a recommendation database as a collocating dress image, and a large amount of collocating dress images having collocation relationships with the first dress image is obtained from the recommendation database, so as to achieve the purpose of recommending a large amount of collocations to a user. Based on the embodiment of the present embodiment, a user merely needs to provide an image which contains a dress to obtain corresponding collocation recommendations based on one or more dress images in the image, thereby providing at least one collocation recommendation for the dress image, overcoming subjective errors caused by human recommendations, and providing the recommendation results for the dress images more objective and more in accordance with user demands.

In an optional example of the embodiment of the apparatus for recommending collocating dress in the present disclosure above, the collocation data is configured to store multiple collocation storage entries obtained based on the acquired multiple collocation reference images, and each collocation storage entry has at least two dress features corresponding to multiple collocation reference images. The at least two dress features are obtained based on the collocation reference images acquired. The at least two dress features in the collocation storage entry have a matching relationship.

In an optional example of the embodiment of the apparatus for recommending collocating dress in the present disclosure above, the recommendation database is configured to classify and store the acquired multiple dress images, the plurality of dress images being classified according to the dress features corresponding to the dress images.

In an optional example of the embodiment of the apparatus for recommending collocating dress in the present disclosure above, the image acquisition unit 31 includes:

a detection module, configured to perform dress detection on the input image to obtain a position and a size of the first dress image; and an acquisition module, configured to obtain the first dress image from the input image based on the position and size of the first dress image.

In another embodiment of the apparatus for recommending collocating dress in the present disclosure, based on the embodiments above, in the apparatus of the embodiment, the first dress feature includes at least one of a semantic dress feature or a numerical dress feature.

The semantic dress feature is used for expressing an attribute feature of the first dress image in the form of text.

The numerical dress feature is used for expressing an attribute feature of the first dress image with a matrix or an array.

In the present embodiments, the mode for extracting the dress feature from the dress image includes, but not limited to, establishing a convolutional neural network model in the machine learning field, and in this case, the semantic dress feature and the numerical dress feature are outputs of different layers of the convolutional neural network, respectively. The semantic dress feature is obtained by converting an image by means of a computer algorithm and taken as an attribute for describing clothing or a fashion accessory in the form of text, and may include, but not limited to, a dress category, a pattern, a color, a material, a shape, a size, a degree of tightness, the length, details, and/or the like. The numerical dress feature is used for determining whether two images are similar. The numerical dress feature may include, but not limited to, a pixel value (e.g., a numerical dress feature of a dress image is 256*256 pixels), and mainly provides a basis for calculating the similarity between two images.

In an optional example of the embodiment of the apparatus for recommending collocating dress in the present disclosure above, the feature acquisition unit 32 includes:

a pixel acquisition module, configured to obtain a pixel matrix of the first dress image, where the pixel matrix includes pixels of multiple positions in the dress image; and a feature calculation module, configured to determine a dress feature matrix of the dress image according to the pixel matrix of the first dress image, and determine the numerical dress feature of the first dress image based on the dress feature matrix.

According to one or more embodiments of the present disclosure, the feature acquisition unit 32 further includes: a semantic acquisition module, configured to obtain a semantic tag probability array of the first dress image. The semantic tag probability array may include at least one semantic tag probability. The semantic tag probability is used for representing a probability value of the first dress image in terms of specific attributes. The semantic dress feature of the first dress image is obtained based on the semantic tag probability array.

In an optional example of the embodiment of the apparatus for recommending collocating dress in the present disclosure above, the feature acquisition unit 32 is configured to obtain the dress feature of the first dress image by means of the convolutional neural network.

The apparatus of the present embodiments further includes: a pre-training unit, configured to train an initial convolutional neural network model by using sample images in advance to obtain a convolutional neural network, where the sample images are annotated with at least one of a semantic dress feature or a numerical dress feature.

According to one or more embodiments of the present disclosure, the dress feature annotated on the sample images includes at least one of a semantic dress feature or a numerical dress feature.

Figure 4:
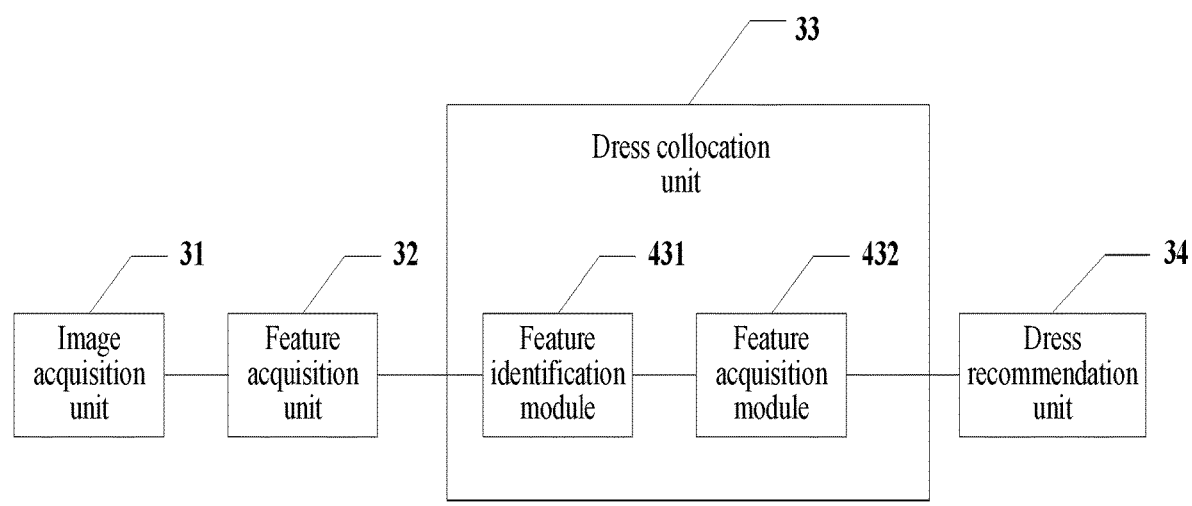
FIG. 4 is a schematic structural diagram of another embodiment of an apparatus for recommending collocating dress according to the present disclosure.

FIG. 4 is a schematic structural diagram of another embodiment of an apparatus for recommending collocating dress according to the present disclosure. Based on the embodiments above, as shown in FIG. 4, the apparatus in the present embodiment includes the following components.

An image acquisition unit 31 is configured to obtain a first dress image from an input image.

One first dress image, or at least two first dress images are obtained. According to one or more embodiments of the present disclosure, the number of obtained first dress images is determined based on the input image and the choice of a user. If the input image merely includes one dress, merely one first dress image is obtained. If the input image includes at least two dresses, the user may select to obtain one of the first dress images or all the first dress images.

The first dress image includes a clothing image and/or a fashion accessory image. The clothing image includes, but not limited to, a top image, a pant image, a skirt image, and/or the like. The fashion accessory image includes, but not limited to, a scarf image, a hat image, a shoe image, a glove image, an accessory image, a sock image, and/or the like. The accessory image includes, but not limited to, items for decorating human bodies, such as, for example, a necklace, a bracelet, a ring, and an earring, and the listed items above are not used to limit the present disclosure. The dress image mentioned in the method of the present disclosure generally refers to items applied to the human body and having a collocation demand.

A feature acquisition unit 32 is configured to obtain a first dress feature of the first dress image.

According to one or more embodiments of the present disclosure, in order to analyze the first dress image, the first dress feature in the image should be obtained, and the dress feature may be obtained by using a machine algorithm in the present embodiments. In this case, if there is merely one first dress image, the first dress feature is obtained directly by using the machine algorithm, and if there are at least two first dress images, at least two first dress features are obtained respectively by using the machine algorithm.

The dress collocation unit 33 includes the following components.

A feature identification module 431 is configured to obtain, based on the first dress feature and dress features in at least one collocation storage entry of a collocation database, at least one dress feature identical to and/or similar to the first dress feature from the collocation database.

Each collocation storage entry stores at least two dress features which match each other, and therefore, after one identical and/or similar dress feature is obtained from the collocation storage entry, a second dress feature matching the first dress feature is obtained.

A feature acquisition module 432 is configured to obtain the matching second dress feature from a collocation storage entry corresponding to the at least one dress feature identical to and/or similar to the first dress feature The at least two dress features stored in the collocation storage entry have a matching relationship, and therefore, the second dress feature collocating with the dress feature is directly obtained based on the dress feature in the collocation storage entry.

A dress recommendation unit 34 is configured to obtain, based on the second dress feature, a dress image identical to and/or similar to the second dress image from a recommendation database as a collocating dress image.

In the present embodiments, in the process of obtaining a dress feature of a reference dress from the collocation database based on the first dress image obtained from the input image, optionally, the first dress feature corresponding to the first dress image is obtained based on the first dress image, and the process of obtaining the first dress feature may be implemented by using the method provided by the embodiments above, or by using other methods to obtain a numerical dress feature and a semantic dress feature corresponding to the first dress image. By carrying out matching between the obtained first dress feature and dress features of all recommended collocation images having collocation relationships stored in the collocation database, at least one dress feature identical to and/or similar to the first dress feature is obtained, and thus the second dress feature having a collocation relationship with the first dress feature is obtained from the recommend collocation images having collocation relationships. In this case, the first dress image corresponding to the first dress feature has a good collocation relationship and effect with the dress image corresponding to the second dress feature. Therefore, a large number of collocating dress images having good collocation effects with regard to the first dress image may be obtained from the recommendation database based on the second dress feature.

In an optional example of the embodiment of the apparatus for recommending collocating dress in the present disclosure above, the feature identification module 431 includes:

a distance calculation module, configured to obtain distances between a numerical dress feature of the first dress feature and numerical dress features of the dress features in the collocation database, respectively;

a candidate acquisition module, configured to select one or more dress features, in the collocation database, having a shortest distance from the numerical dress feature of the first dress feature as first candidate features; and a semantic identification module, configured to select a first candidate feature identical to the semantic dress feature of the first dress feature as the at least one dress feature identical to and/or similar to the first dress feature.

In yet another embodiment of the apparatus for recommending collocating dress in the present disclosure, based on the embodiments above, in the apparatus of the embodiment, the dress recommendation unit 34 is further configured to select, based on the second dress feature and the dress features of the plurality of dress images in the recommendation database, at least one dress feature identical to and/or similar to the second dress feature from the recommendation database; and take the dress image corresponding to the at least one dress feature identical to and/or similar to the second dress feature as the collocating dress image.

In the present embodiments, the dress image corresponding to the dress feature identical to and/or similar to the second dress feature is obtained from the recommendation database and taken as the collocating dress image of the first dress image because the second dress feature and the first dress feature have a collocation relationship. Therefore, the dress image corresponding to the dress feature identical to and/or similar to the second dress feature collocates with the first dress image.

In an optional example of the embodiment of the apparatus for recommending collocating dress in the present disclosure above, the dress recommendation unit 34 includes:

a distance acquisition module, configured to obtain distances between a numerical dress feature of the second dress feature and numerical dress features of the dress images in the recommendation database, respectively;

a distance selection module, configured to select one or more dress features, in the recommendation database, having a shortest distance from the numerical dress feature of the second dress feature as second candidate features; and a collocation acquisition module, configured to select the second candidate feature identical to the semantic dress feature of the second dress feature as the at least one dress feature identical to and/or similar to the second dress feature.

Figure 5:
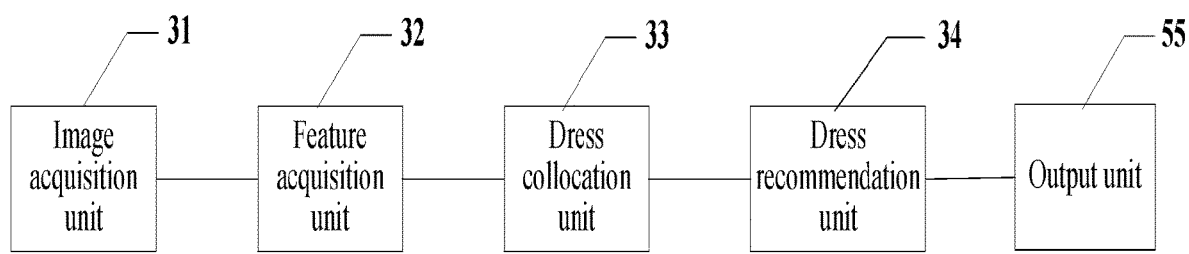
FIG. 5 is a schematic structural diagram of yet another embodiment of an apparatus for recommending collocating dress according to the present disclosure.

FIG. 5 is a schematic structural diagram of yet another embodiment of an apparatus for recommending collocating dress according to the present disclosure. Based on the embodiments above, the apparatus of the embodiment further includes:

an output unit 55, configured to output a collocating dress image; and/or synthesize the first dress image with the collocating dress image to obtain one or more collocation effect images, and outputting the collocation effect images.

In the present embodiments, by outputting the collocating dress image and/or outputting the collocation effect image, the collocation effect for the dress image in the output image has a better visual effect, overcoming the defect of a recommendation method in the prior art being unable to directly reflect a visual collocation effect. A combined image having a visual collocation effect is directly outputted, and a user is able to view the collocation effect more directly.

In an optional example of the embodiment of the apparatus for recommending collocating dress in the present disclosure above, the further output 55 is further configured to output related feature information of the collocation dress.

The related feature information is used for identifying part of features of the collocating dress different from other dresses, and/or used for identifying the collocation effect of the dress corresponding to the first dress image.

According to another aspect of the embodiments of the present disclosure, provided is an electronic device, which is provided with the apparatus for recommending collocating dress according to any one of the embodiments of the present disclosure as stated above.

According to another aspect of the embodiments of the present disclosure, provided is an electronic device, including a memory configured to store an executable instruction; and a processor configured to communicate with the memory to execute the executable instruction so as to complete operations of the method for recommending collocating dress according to any one of the embodiments of the present disclosure as stated above.

According to another aspect of the embodiments of the present disclosure, provided is a computer readable storage medium, configured to store computer-readable instructions, where when the instructions are executed, the operations in any one of the embodiments of the method for recommending collocating dress in the present disclosure as stated above are implemented.

Figure 6:
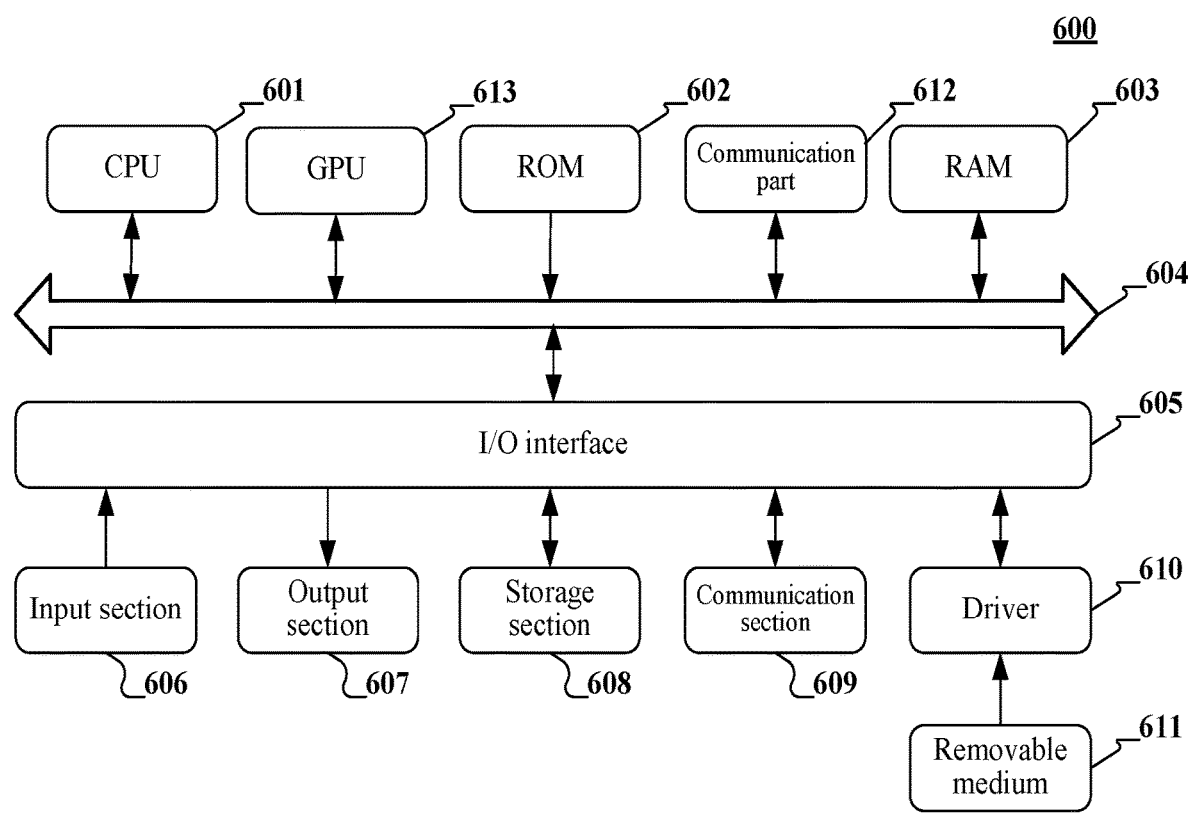
FIG. 6 is a schematic structural diagram of an electronic device according to embodiments of the present disclosure.

The embodiments of the present disclosure further provide an electronic device which, for example, is a mobile terminal, a Personal Computer (PC), a tablet computer, a server, or the like. Referring to FIG. 6 below, a schematic structural diagram of an electronic device 600, which may be a terminal device or a server, suitable for implementing an embodiment of the present disclosure is shown. As shown in FIG. 6, the computer system 600 includes one or more processors, a communication section, and the like. The one or more processors are, for example, one or more Central Processing Units (CPUs) 601 and/or one or more Graphic Processing Units (GPUs) 613, and the processors may execute appropriate actions and processing according to executable instructions stored in a Read-Only Memory (ROM) 602 or executable instructions loaded from a storage part 608 to a Random Access Memory (RAM) 603. The communication part 612 may include, but is not limited to, a network card. The network card may include, but is not limited to, an IB network card.

The processor may communicate with the ROM 602 and/or the RAM 603 to execute executable instructions, is connected to the communication part 612 by means of a bus 604, and communicates with other target devices by means of the communication part 612, so as to complete corresponding operations of any of the methods provided by the embodiments of the present disclosure, for example, a first dress image is obtained from an input image; a first dress feature of the first dress image is obtained; based on the first dress feature, a second dress feature matching the first dress feature is obtained from a collocation database, the second dress feature being a dress feature of a second dress image collocating with the first dress image; and based on the second dress feature, a dress image identical to and/or similar to the second dress image is obtained from a recommendation database as a collocating dress image.

In addition, the RAM 603 further stores various programs and data required for operations of the apparatus. The CPU 601, the ROM 602, and the RAM 603 are connected to each other by means of the bus 604. In the presence of the RAM 603, the ROM 602 is an optional module. The RAM 603 stores executable instructions, or writes the executable instructions into the ROM 602 during running, where the executable instructions cause the CPU 601 to execute corresponding operations of the foregoing communication method. An input/output (I/O) interface 605 is also connected to the bus 604. The communication portion 612 may be integrated, or may be configured to have a plurality of sub-modules (for example, a plurality of IB network cards) connected to the bus.

The following components are connected to the I/O interface 605: an input section 606 including a keyboard, a mouse, or the like; an output section 607 including a Cathode-Ray Tube (CRT), a Liquid Crystal Display (LCD), a speaker, or the like; the storage section 608 including a hard disk, or the like; and a communication part 609 of a network interface card including an LAN card, a modem, or the like. The communication section 609 performs communication processing via a network such as the Internet. A drive 610 is also connected to the I/O interface 605 according to requirements. A removable medium 611 such as a magnetic disk, an optical disk, a magneto-optical disk, a semiconductor memory or the like is mounted on the drive 610 according to requirements, so that a computer program read from the removable medium is installed on the storage section 608 according to requirements.

It should be noted that the architecture illustrated in FIG. 6 is merely an optional implementation mode. During optional practice, the number and types of the components in FIG. 6 are selected, decreased, increased, or replaced according to actual requirements. Different functional components are separated or integrated or the like. For example, the GPU 613 and the CPU 601 are separated, or the GPU 613 is integrated on the CPU 601, and the communication part are separated from or integrated on the CPU 601 or the GPU 613 or the like. These alternative implementations all fall within the scope of protection of the present disclosure.

Particularly, a process described above with reference to a flowchart according to the embodiments of the present disclosure is implemented as a computer software program. For example, an embodiment of the present disclosure includes a computer program product. The computer program product includes a computer program tangibly included in a machine-readable medium. The computer program includes a program code for executing a method shown in the flowchart. The program code may include corresponding instructions for correspondingly executing operations of the method provided by the embodiments of the present disclosure, for example, a first dress image is obtained from an input image; a first dress feature of the first dress image is obtained; based on the first dress feature, a second dress feature matching the first dress feature is obtained from a collocation database, the second dress feature being a dress feature of a second dress image collocating with the first dress image; and based on the second dress feature, a dress image identical to and/or similar to the second dress image is obtained from a recommendation database as a collocating dress image. In such embodiment, the computer program is downloaded and installed from the network through the communication section 609, and/or is installed from the removable medium 611. The computer program, when being executed by the CPU 601, executes the foregoing functions defined in the methods of the present disclosure.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods and apparatuses in the present disclosure may be implemented in many manners. For example, the methods and apparatuses in the present disclosure may be implemented with software, hardware, firmware, or any combination of software, hardware, and firmware. The foregoing specific sequence of operations of the method is merely for description, and unless otherwise stated particularly, is not intended to limit the operations of the method in the present disclosure. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to persons of ordinary skill in the art. The embodiments are selected and described to better describe a principle and an actual application of the present disclosure, and to make persons of ordinary skill in the art understand the present disclosure, so as to design various embodiments with various modifications applicable to particular use.

The invention claimed is:

1. A method for recommending collocating dress, comprising:
    obtaining a first dress image from an input image;
    obtaining a first dress feature of the first dress image;
    obtaining, based on the first dress feature, a second dress feature matching the first dress feature from a collocation database, the second dress feature being a dress feature of a second dress image;
    obtaining, based on the second dress feature, a dress image identical to and/or similar to the second dress image from a recommendation database as a collocating dress image, wherein the first dress feature comprises a semantic dress feature and/or a numerical dress feature; and
    the semantic dress feature being used for expressing an attribute feature of the first dress image in the form of text, and the numerical dress feature being used for expressing the attribute feature of the first dress image with a matrix or an array.

2. The method according to claim 1, further comprising:
    before the obtaining a first dress image from an input image,
    obtaining at least two dress features of each of a plurality of collocation reference images acquired; and
    storing the at least two dress features corresponding to each collocation reference image in one collocation storage entry of the collocation database, wherein the at least two dress features in each collocation storage entry have a matching relationship.

3. The method according to claim 1, further comprising:
    before the obtaining a first dress image from an input image,
    obtaining a dress feature corresponding to each of a plurality of dress images acquired; and
    classifying the plurality of dress images based on the dress feature corresponding to each of the plurality of dress images, and storing the plurality of dress images into the recommendation database according to a classification result of the plurality of dress images.

4. The method according to claim 1, wherein the obtaining a first dress image from an input image comprises:
    performing dress detection on the input image to obtain a position and a size of the first dress image; and
    obtaining the first dress image from the input image based on the position and size of the first dress image.

5. The method according to claim 1, wherein the obtaining a first dress feature of the first dress image comprises:
    obtaining a pixel matrix of the first dress image, wherein the pixel matrix comprises pixels of multiple positions in the first dress image;
    determining a dress feature matrix of the first dress image according to the pixel matrix of the first dress image; and
    determining the numerical dress feature of the first dress image based on the dress feature matrix.

6. The method according to claim 5, wherein the obtaining a first dress feature of the first dress image comprises:
    obtaining a semantic tag probability array of the first dress image, wherein the semantic tag probability array comprises at least one semantic tag probability, and the semantic tag probability is used for representing a probability value of the first dress image in terms of attributes; and
    obtaining the semantic dress feature of the first dress image based on the semantic tag probability array.

7. The method according to claim 1, wherein the obtaining a first dress feature of the first dress image comprises:
    obtaining the dress feature of the first dress image by means of a convolutional neural network; and
    wherein the method further comprises:
    training an initial convolutional neural network model by using sample images in advance, to obtain the convolutional neural network, wherein the sample images are annotated with a dress feature.

8. The method according to claim 1, wherein the obtaining, based on the first dress feature, a second dress feature matching the first dress feature from a collocation database comprises:
    obtaining, based on the first dress feature and a dress feature in at least one collocation storage entry of the collocation database, at least one dress feature identical to and/or similar to the first dress feature from the collocation database; and
    obtaining the matching second dress feature from a collocation storage entry corresponding to the at least one dress feature identical to and/or similar to the first dress feature.

9. The method according to claim 8, wherein the obtaining, based on the first dress feature and dress features in at least one collocation storage entry of the collocation database, at least one dress feature identical to and/or similar to the first dress feature from the collocation database comprises:
    obtaining distances between a numerical dress feature of the first dress feature and numerical dress features of the dress features in the collocation database, respectively;
    selecting one or more dress features, in the collocation database, having a shortest distance from the numerical dress feature of the first dress feature as first candidate features; and
    selecting a first candidate feature identical to the semantic dress feature of the first dress feature as the at least one dress feature identical to and/or similar to the first dress feature.

10. The method according to claim 1, wherein the obtaining, based on the second dress feature, a dress image identical to and/or similar to the second dress image from a recommendation database as a collocating dress image comprises:
    selecting, based on the second dress feature and the dress features of the plurality of dress images in the recommendation database, at least one dress feature identical to and/or similar to the second dress feature from the recommendation database; and
    taking the dress image corresponding to the at least one dress feature identical to and/or similar to the second dress feature as the collocating dress image.

11. The method according to claim 10, wherein the selecting, based on the second dress feature and dress features of the plurality of dress images in the recommendation database, at least one dress feature identical to and/or similar to the second dress feature from the recommendation database comprises:
    obtaining distances between a numerical dress feature of the second dress feature and numerical dress features of the plurality of dress images in the recommendation database, respectively;
    selecting one or more dress features, in the recommendation database, having a shortest distance from the numerical dress feature of the second dress feature as second candidate features; and selecting the second candidate feature identical to the semantic dress feature of the second dress feature as the at least one dress feature identical to and/or similar to the second dress feature.

12. The method according to claim 1, further comprising: after the obtaining a dress image identical to and/or similar to the second dress image from a recommendation database as a collocating dress image,
   outputting the collocating dress image; and/or
   synthesizing the first dress image with the collocating dress image to obtain one or more collocation effect images, and outputting the collocation effect images.

13. The method according to claim 12, further comprising:
   outputting related feature information of a collocating dress, wherein the related feature information is used for at least one of: describing at least part of features of the collocating dress different from other dresses, or used for describing the collocation effect of the collocating dress and the dress corresponding to the first dress image.

14. An apparatus for recommending collocating dress, comprising:
   a memory storing processor-executable instructions; and
   a processor arranged to execute the stored processor-executable instructions to perform operations of:
   obtaining a first dress image from an input image;
   obtaining a first dress feature of the first dress image;
   obtaining, based on the first dress feature, a second dress feature matching the first dress feature from a collocation database, the second dress feature being a dress feature of a second dress image;
   obtaining, based on the second dress feature, a dress image identical to and/or similar to the second dress image from a recommendation database as a collocating dress image, wherein the first dress feature comprises a semantic dress feature and/or a numerical dress feature; and
   the semantic dress feature being used for expressing an attribute feature of the first dress image in the form of text, and the numerical dress feature being used for expressing the attribute feature of the first dress image with a matrix or an array.

15. The apparatus according to claim 14, wherein the processor is arranged to execute the stored processor-executable instructions to further perform operations of: before the obtaining a first dress image from an input image,
   obtaining at least two dress features of each of a plurality of collocation reference images acquired; and
   storing the at least two dress features corresponding to each collocation reference image in one collocation storage entry of the collocation database, wherein the at least two dress features in each collocation storage entry have a matching relationship.

16. The apparatus according to claim 14, wherein the processor is arranged to execute the stored processor-executable instructions to further perform operations of: before the obtaining a first dress image from an input image,
   obtaining a dress feature corresponding to each of a plurality of dress images acquired; and
   classifying the plurality of dress images based on the dress feature corresponding to each of the plurality of dress images, and storing the plurality of dress images into the recommendation database according to a classification result of the plurality of dress images.

17. The apparatus according to claim 14, wherein the obtaining a first dress image from an input image comprises:
   performing dress detection on the input image to obtain a position and a size of the first dress image; and
   obtaining the first dress image from the input image based on the position and size of the first dress image.

18. A non-transitory computer-readable storage medium having stored thereon computer-readable instructions, that when executed by a processor, cause the processor to implement operations of a method for recommending collocating dress, the method comprising:
   obtaining a first dress image from an input image;
   obtaining a first dress feature of the first dress image;
   obtaining, based on the first dress feature, a second dress feature matching the first dress feature from a collocation database, the second dress feature being a dress feature of a second dress image;
   obtaining, based on the second dress feature, a dress image identical to and/or similar to the second dress image from a recommendation database as a collocating dress image, wherein the first dress feature comprises a semantic dress feature and/or a numerical dress feature; and
   the semantic dress feature being used for expressing an attribute feature of the first dress image in the form of text, and the numerical dress feature being used for expressing the attribute feature of the first dress image with a matrix or an array.

* * * * *